Sept. 1, 1925.

S. O. BARNSTEAD 1,551,784

BUTTER COLOR CONTAINING CAPSULE

Filed April 12, 1920

INVENTOR
Sidney O. Barnstead
BY Ralph Kalish ATTORNEY.

Patented Sept. 1, 1925.

1,551,784

UNITED STATES PATENT OFFICE.

SIDNEY O. BARNSTEAD, OF ST. LOUIS, MISSOURI, ASSIGNOR TO THE THEROZ COMPANY, OF NEW YORK, N. Y., A CORPORATION OF NEW YORK.

BUTTER-COLOR-CONTAINING CAPSULE.

Application filed April 12, 1920. Serial No. 373,422.

*To all whom it may concern:*

Be it known that I, SIDNEY O. BARNSTEAD, a citizen of the United States, residing at the city of St. Louis, State of Missouri, have invented a certain new and useful Improvement in Butter-Color-Containing Capsules, of which the following is a specification, reference being had to the accompanying drawing, forming a part thereof.

This invention relates generally to capsules and, more particularly, to a certain new and useful improvement in that class of capsules commonly known as butter-color containing capsules for oleomargarine and the like.

The opening or puncturing of a butter-color containing capsule as heretofore generally constructed is almost invariably, so far as I am aware, accompanied or attended with a quick gushing forth of its contents which, in gushing from the capsule, often spatter and permanently soil the clothes of the housewife, adjacent objects, and the like.

The principal object of my present invention is to provide a capsule especially adapted as a container or carrier of butter-color so constructed as to entirely obviate such occurrence—to provide a butter-color containing capsule which may be conveniently opened to free or discharge its contents without a gushing forth thereof.

With the above and other objects in view, my present invention resides in the novel features of form, construction, arrangement, and combination of parts hereinafter described and afterwards pointed out in the claims.

Capsules at the present time adapted as carriers or containers of butter-color for oleomargarine comprise in their composition gelatine or glue or both, mixed with varying amounts of glycerine, dextrin, acacia, starches, and other diluents the greater the percentage of glycerine, the softer the capsule. In the production of the present capsule, I follow generally the composition and process of manufacture now in common use, and since the same are well known and common in the art, I omit here any further or detail description thereof. To accomplish the object stated, however, I construct the capsule in the manufacture thereof with an integral teat, which is in communication with the interior or butter-color containing chamber of the capsule, and which may be conveniently cut by a pair of shears or the like to provide a safe, non-gushing discharge-outlet for the contents of the capsule.

In the accompanying drawing, I illustrate several forms of butter-color containing capsules embodying my invention,—

Figure 1:
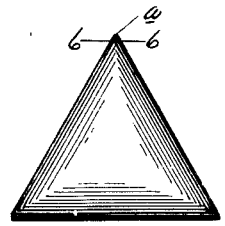

Figure 1 being an elevational view of a triangular capsule, and

Figure 2:
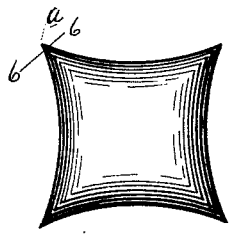

Figure 2 being an elevational view of a cushion-shaped capsule.

I prefer that the body of the capsule, which is imperforated and hollow, be made of a triangular or cushion shape, as shown in the drawings, in which shapes the communicating opening teat for the capsule body is in the form of a projecting reduced corner extension $a$ more or less sharply defined, which may be evenly sheared as along line 6—6, to provide a convenient outlet through which the contents of the capsule will freely flow without gushing.

My invention, which may be embodied in either a soft or hard capsule, is simple, and yet most efficiently accomplishes the object stated.

I am aware that changes in the form, construction, and combination of the several parts of the capsule may be made and substituted for those herein shown and described without departing from the nature and principle of my invention.

Having thus described my invention, what I claim and desire to secure by Letters Patent is:

1. As a new article of manufacture, a butter-color containing capsule comprising integrally an imperforate hollow angular body and a communicating reduced relatively small sharp corner extension projecting outwardly from, and providing an opening-teat for, the body.

2. As a new article of manufacture, a gelatinous butter-color containing capsule comprising integrally an imperforate hollow body of angular cushion formation, the corners of said body being sharply defined and each providing an opening-teat for the body.

3. An article of the character described, pillow-shaped and enclosing a liquid content, and presenting a plurality of angular points at the edge, any one of which may be removed or severed to give direction to the discharge of the liquid content of the device.

In testimony whereof, I have signed my name to this specification.

SIDNEY O. BARNSTEAD.